Nov. 2, 1948.          D. GROSCH          2,452,748
MUSIC INSTRUCTION DEVICE FOR USE WITH THE PIANO
Filed Nov. 8, 1943

INVENTOR.
David Grosch
BY
ATTORNEY.

Patented Nov. 2, 1948

2,452,748

UNITED STATES PATENT OFFICE 2,452,748

MUSIC INSTRUCTION DEVICE FOR USE WITH THE PIANO

David Grosch, Kansas City, Mo.

Application November 8, 1943, Serial No. 509,352

1 Claim. (Cl. 84—473)

This invention relates to the music teaching art and has particular reference to means for instructing students of the piano in the proper use of the keyboard thereof.

One of the important aims of the present invention is the provision of a piano instruction device capable of teaching the user thereof, music fundamentals.

A yet further object of the instant invention is to provide a simple, effective, inexpensive yet accurate means for teaching all phases of piano fundamentals, including advanced harmony, counterpoint, scales, chords or any musical progression or arrangements where the piano is employed as a medium of imparting sound.

This invention has for one of its important aims the provision of an instruction device of the aforementioned character that is capable of imparting to the student, the feel of the keyboard at the inception of his work, to the end that scales and chords may be played at the outset without the employment of written music.

A further aim of the invention is to provide a piano instruction device having as a part thereof, an unique holder formed of sheet material and having pictorial illustrations of a portion of the piano keyboard on one face thereof, through which sheet material a number of specially disposed apertures are created, which holder combines with a shiftable chart provided with indicia and explanatory matter that appears to the view of the user, resulting in teaching the sequence in which the keys of the piano are to be struck and in advising what scale or chord, for example, is being played.

Other objects of the invention will appear during the course of the following specification, referring to the accompanying drawing, wherein.

Figure 1:
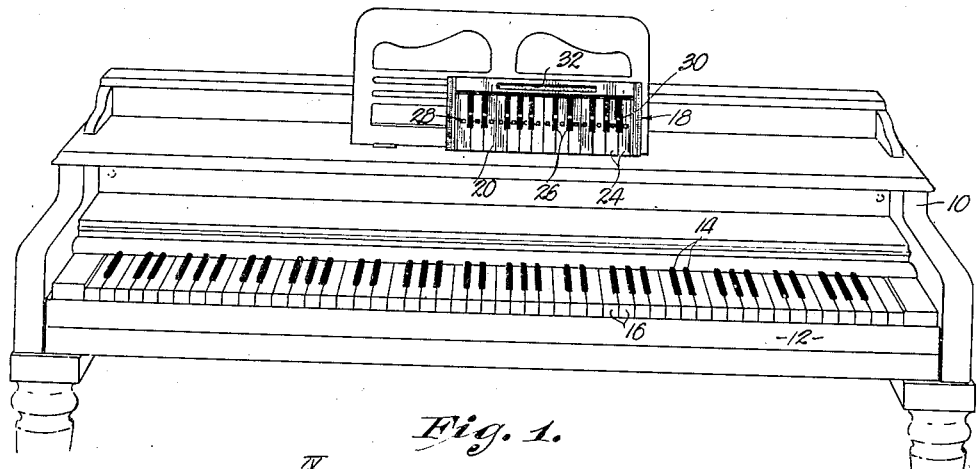
Fig. 1 is a perspective view of a conventional piano having associated with the keyboard thereof, a music instruction device made in accordance with the present invention.

When employing the instruction device illustrated the same is preferably positioned upon a piano 10 having a conventional keyboard 12, comprising a number of black keys 14 and a plurality of white keys 16.

The device per se comprises a holder 18 made of sheet material to present a flat, tubular body having two planar superimposed walls 20 and 22 respectively.

One face of wall 20 has a pictorial illustration of a portion of the piano keyboard 12 and a number of white keys 24 and black keys 26 shown thereon and sized to substantially agree with the corresponding keys 14 and 16 of piano keyboard 12.

A series of apertures 28 formed through the material from which wall 20 is made, are disposed in alignment and each aperture is in an area defining a white key 24 respectively. Another series of apertures 30 is formed through the material from which wall 20 is made and are disposed in the area defining the black keys 26. Apertures 30 are in alignment and are offset from the series of aligned apertures 28—thus confusion is eliminated and fingering is facilitated.

This wall 20 is also provided with a window 32 near one longitudinal edge thereof and above the area of the wall 20 occupied by the illustration of a portion of the keyboard.

A chart broadly designated by the numeral 34, is shiftably retained within holder 18 by frictional engagement with the inner surfaces of walls 20 and 22. This chart has indicia 36 thereon, the component parts whereof are arranged in groups to appear behind apertures 28 and 30. This indicia may be in the form of check marks, sharps, flats, naturals, numerals, notes or the like, arranged in sequence to indicate to the user the order in which corresponding keys of keyboard 12 are to be struck. Broadly speaking, indicia 36 is employed to teach where to place the fingers on the piano keyboard and the order of key manipulation.

Figure 2:
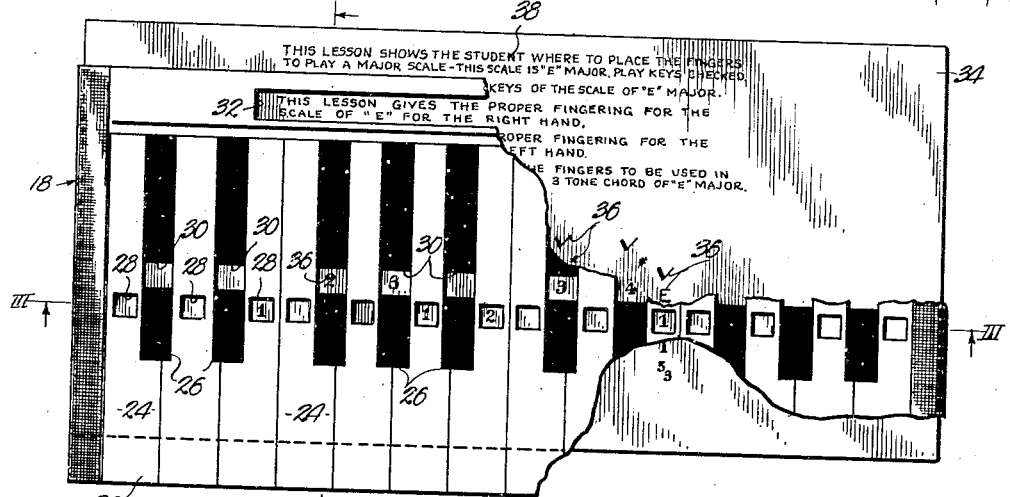
Fig. 2 is an enlarged fragmentary face view of the instruction device.
Figure 3:
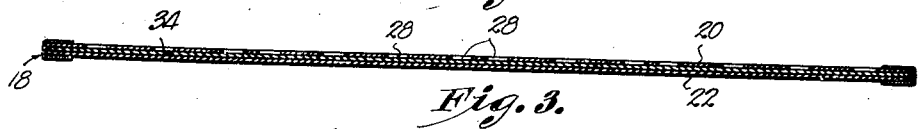
Fig. 3 is a longitudinal sectional view through the music instruction device, taken on line III—III of Fig. 2.
Figure 4:
Fig. 4 is a transverse cross sectional view taken on line IV—IV of Fig. 2.

Indicia 36 is closely allied with explanatory matter 38 printed upon the face of chart 34 and spaced to appear through window 32. Explanatory matter is grouped with regard to the grouping of indicia 36 and as shown in Fig. 2.

When certain fingering and sequence of key manipulation is imparted to the student by the numerals forming a part of indicia 36, the window 32 will reveal explanatory matter indicating that when the white and black keys are struck in the order of said numerals, the proper fingering for the scale of E for the right-hand, is being practiced. Obviously, any explanatory matter having regard to the indicia appearing behind perforations 28 and 30 may be placed upon chart 34 to impart at a glance, just what scale or fingering is taking place when the indicia appearing behind the aligned apertures 28 and 30 are used as a guide for playing keyboard 12.

It is obvious from the examples given in the foregoing specification that indicia and explanatory matter 36 and 38 respectively, may be of a wide range in character and any music fundamental may be made clear to the piano student. It is also obvious that one unskilled in piano playing, yet desiring to practice voice training, may play selected scales or chords without means other than the device above described.

It is realized that the invention may be embodied in structures having physical characteristics different from that illustrated in the accompanying drawing, and therefore, it is desired to be limited only by the scope of the appended claim.

Having thus described the invention, what is claimed as new and desired to be secured by Letters Patent is:

A piano instruction device of the character described comprising a holder of sheet material having a pictorial illustration of a portion of the piano keyboard on one face thereof, said illustration including a row of white keys and a row of black keys, and apertures formed through the sheet material in the areas defining each key of the illustrated portion of said keyboard, there being one aperture for each key respectively; and a single chart having indicia thereon, shiftably mounted on the holder in positions where certain of the said indicia are exposed to view through certain of the apertures, the apertures in the areas occupied by the black keys being in alignment across the holder, the apertures in the areas occupied by the white keys being in alignment across the holder, the line of apertures in the black key areas being offset from the line of apertures in the white key areas, the indicia on the chart being grouped with respect to the position of the two lines of apertures, said indicia being of a character to teach the order in which the corresponding keys of the piano keyboard are to be struck, said holder being provided with an elongated window adjacent the normally uppermost longitudinal, marginal edge thereof through which particular areas of the chart are viewable when certain indicia are exposed to view through the said apertures, said particular areas having explanatory matter applicable to the indicia showing through the apertures when the explanatory matter is viewable through the window said chart being frictionally held in position by the sheet material holder, said holder being of flat, tubular form presenting two planar, superimposed walls to receive the chart therebetween, said chart being shiftable within the said tubular holder in directions parallel with the longitudinal length of said keys.

DAVID GROSCH.

REFERENCES CITED

The following references are of record in the file of this patent:

UNITED STATES PATENTS

| Number | Name | Date |
| --- | --- | --- |
| 586,631 | Stebinger | July 30, 1897 |
| 1,605,157 | Wickersham | June 7, 1898 |
| 1,783,361 | Gibson | Dec. 2, 1930 |
| 2,332,842 | Champion | Oct. 26, 1943 |